United States Patent [19]

Schneider

[11] Patent Number: 4,552,281

[45] Date of Patent: Nov. 12, 1985

[54] GLASS FIBER REINFORCED RESIN TANK WITH PARTICULAR JOINT STRUCTURE

[75] Inventor: William A. Schneider, Conroe, Tex.

[73] Assignee: Owens-Corning Fiberglas Corporation, Toledo, Ohio

[21] Appl. No.: 626,071

[22] Filed: Jun. 29, 1984

[51] Int. Cl.$^4$ ............................ B65D 8/06; B65D 8/18
[52] U.S. Cl. ...................... 220/5 A; 220/80; 220/83; 220/414; 220/457
[58] Field of Search ............ 220/3, 5 A, 457, 83, 220/414, 80; 138/155

[56] References Cited

U.S. PATENT DOCUMENTS

| | | | |
|---|---|---|---|
| 1,748,138 | 2/1930 | McBride | 220/5 A X |
| 2,775,262 | 12/1956 | Wread | 138/45 X |
| 3,412,891 | 11/1968 | Bastone et al. | 220/5 A X |
| 3,606,958 | 9/1971 | Coffman | 220/83 |
| 3,661,294 | 5/1972 | Pearson et al. | 220/3 X |
| 3,918,919 | 11/1975 | Walburg et al. | 220/5 A X |
| 4,004,706 | 1/1977 | Guldenfels | 220/3 |
| 4,120,325 | 10/1978 | de Putter | 138/155 X |
| 4,220,180 | 9/1980 | Koga et al. | 138/155 X |

FOREIGN PATENT DOCUMENTS 5631 of 1899 United Kingdom .............. 220/5 A

Primary Examiner—Allan N. Shoap
Attorney, Agent, or Firm—Ronald C. Hudgens; Patrick P. Pacella; Paul J. Rose

[57] ABSTRACT

Two halves of a tank are secured together by an external lay-up comprising corrosion-resistant resin. Each tank half includes an outer structural wall and an inner liner, the structural wall comprising corrodible resin, the liner comprising corrosion-resistant resin, the structural wall ending short of the inner end of the tank half, and the liner being radially enlarged at the inner end of the tank half to cover the inner end of the structural wall.

4 Claims, 3 Drawing Figures

GLASS FIBER REINFORCED RESIN TANK WITH PARTICULAR JOINT STRUCTURE

TECHNICAL FIELD

This invention relates generally to glass fiber reinforced resin storage tanks, and more particularly to the joint structure between two halves.

BACKGROUND ART

Glass fiber reinforced resin tanks are typically made of isophthalic resin, chopped glass strands, and a filler such as sand. External ribs of woven glass roving and glass filament windings impregnated with resin are usually provided. Generally a resin-rich liner is also provided consisting of about a 20-mil thickness of resin with a surface mat and an 80-mil thickness of resin and chopped glass strands. When a tank is to be used to store corrosive liquids which attack isophthalic resin, polyester or vinylester resin may be used as the liner resin. The tanks are made of two halves, as generally disclosed in U.S. Pat. No. 3,700,512, joined by an external lay-up of a plurality of interleaved layers of woven glass roving and chopped strand mat impregnated with resin. Prior to my invention, tanks for corrosive liquid service were also provided at the joint with an internal lay-up of a plurality of interleaved layers of woven glass roving and chopped strand mat impregnated with a corrosion-resistant resin such as polyester or vinylester resin. For application of this internal lay-up, one of the tank halves had to be provided with a manway, which added considerably to the cost of the tank.

DISCLOSURE OF INVENTION

In accordance with the invention, a joint structure is provided, in a tank for corrosive liquid service, wherein no internal lay-up is required, and therefore no manway is required, but the isophthalic resin portion of the tank is nevertheless shielded from corrosive liquids.

BRIEF DESCRIPTION OF THE DRAWINGS

The invention is more fully described hereinafter, reference being had to the accompanying drawings wherein.

BEST MODE OF CARRYING OUT THE INVENTION

Figure 1:
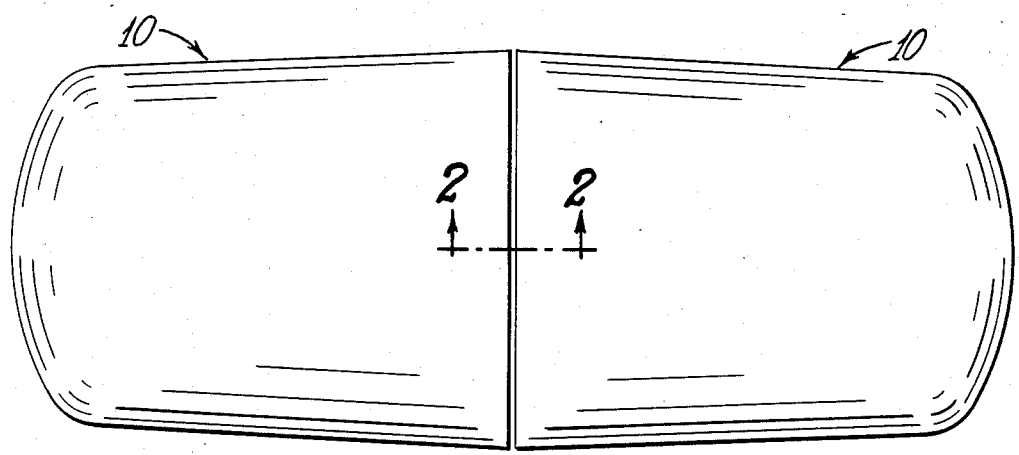
FIG. 1 is a side view of two tank halves constructed in accordance with the invention and disposed in relative positions suitable for the application of an external lay-up to complete a tank.

With respect to the drawings, FIG. 1 shows two generally cylindrical tank halves 10 constructed in accordance with the invention and having open inner ends and closed outer ends. The tank halves 10 are shown as generally cylindrical but having tapered sidewalls, as made on a tapered mandrel such as disclosed in U.S. Pat. No. 3,700,512, but the sidewalls may be truly cylindrical if the tank halves 10 are made on a collapsible mandrel, such as disclosed in U.S. Pat. No. 4,233,020. The normal external ribs on the tank halves 10 are omitted.

Figure 2:
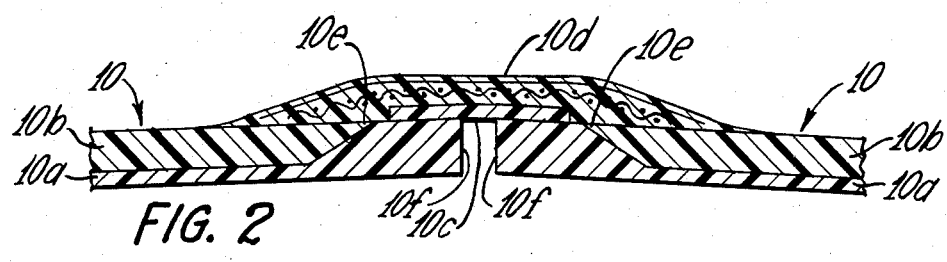
FIG. 2 is a fragmentary sectional view taken generally along line 2—2 of FIG. 1, but including an external lay-up joining the two tank halves.

As shown in FIG. 2, each tank half 10 includes a liner 10a and a structural wall 10b, the usual surface mat and chopped glass strands being omitted in the representation of the liner 10a and the usual chopped glass strands and filler being omitted in the representation of the structural wall 10b. In accordance with the invention, an inner end 10e of the structural wall 10b of each tank half 10 is spaced from an inner end 10f of the tank half, and the liner 10a is radially enlarged adjacent the inner end 10f of the tank half essentially to the full wall thickness to cover the inner end 10e of the structural wall 10b. The liner 10a comprises corrosion-resistant resin such as polyester or polyvinyl resin, while the structural wall 10b comprises corrodible resin such as isophthalic resin. Further in accordance with the invention, the tank halves 10 are secured together preferably by two exterior lay-ups 10c and 10d. The lay-up 10c comprises corrosion-resistant resin which may be the same kind as the resin of the liner 10a, and the lay-up 10d comprises corrodible resin which may be the same kind as the resin in the structural wall 10b. Alternatively, a single lay-up could be made in place of the two lay-ups 10c and 10d, the single lay-up comprising corrosion-resistant resin. The reinforcement in the lay-ups 10c and 10d is only partially shown and preferably comprises layers of woven glass roving interleaved between layers of chopped glass strand mat.

Figure 3:
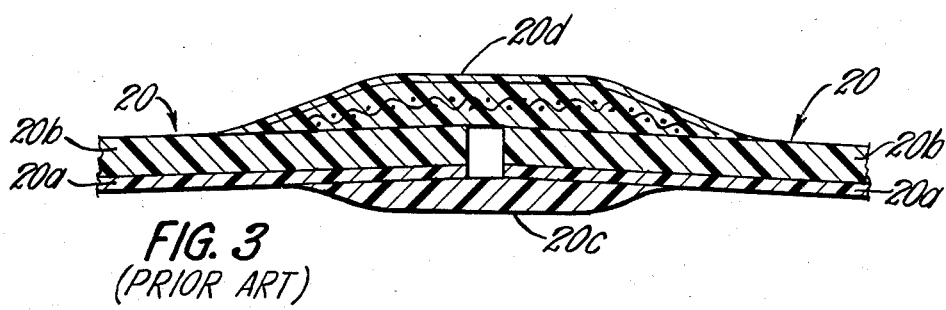
FIG. 3 is a view similar to FIG. 2 but illustrating a tank of the prior art.

The prior art construction is shown in FIG. 3 and comprises two tank halves 20 each having a linear 20a and a structural wall 20b. The liner 20a is of substantially uniform thickness all the way to the inner end of the tank half. Further, the structural wall 20b is of substantially uniform thickness all the way to the inner end of the tank half. The two tank halves 20 are secured together by an interior lay-up 20c and an exterior lay-up 20d of resin-impregnated layers of woven glass roving interleaved between resin-impregnated layers of chopped glass strand mat, the reinforcement being partially shown in the lay-up 20d. The resin in the lay-up 20c and the resin in the liner 20a are corrosion resistant. The resin in the lay-up 20d and the resin in the structural wall 20b are corrodible.

In each case, it will be seen that corrosive liquids in the tank would have no contact with the resin of the structural wall 10b or 20b or the resin of the lay-up 10d or 20d, but the prior art construction requires the interior lay-up 20c and therefore also requires a manway in one of the tank halves 20.

Various modifications may be made in the structure shown in FIGS. 1 and 2 and described above, without departing from the scope of the invention.

I claim:

1. An elongated generally cylindrical fiber-reinforced resin tank particularly adapted to contain corrosive liquids and comprising two tank halves each having a closed end and a flangeless open end and each having an inner liner of corrosion-resistant resin and an outer structural wall of corrodible resin, the corrodible structural wall of each tank half ending short of the flangeless open end thereof in a direction axially of the tank and the corrosion-resistant inner liner of each tank half extending axially of the tank past an end of the structural wall of the tank half adjacent the flangeless open end thereof and being radially enlarged adjacent said flangeless open end thereby to cover said end of the structural wall and present a radially outer surface substantially flush with the outer surface of the structural wall, and an external lay-up bridging the flangeless open ends of the tank halves on the outside of the tank and securing the two tank halves relative to each other with the flangeless open ends thereof adjacent each other, said external lay-up being subject to contact by corrosive liquid or vapors thereof when corrosive liquid is stored in the tank and at least a radially inner portion of the external lay-up comprising corrosion-resistant resin.

2. A tank as claimed in claim 1 wherein the corrosion-resistant resin of the external lay-up is the same kind of resin as the resin of the inner liners of the tank halves.

3. A tank as claimed in claim 1 wherein a radially outer portion of the external lay-up comprises corrodible resin.

4. A tank as claimed in claim 1 wherein reinforcing fibers of the fiber-reinforced resin tank are glass fibers.

* * * * *